United States Patent [19]

Fukutomi et al.

[11] Patent Number: 4,703,733

[45] Date of Patent: Nov. 3, 1987

[54] IGNITION TIMING CONTROL METHOD FOR INTERNAL COMBUSTION ENGINES

[75] Inventors: Yohji Fukutomi, Sayama; Hidekazu Kano, Higashimatsuyama; Akira Kato, Itabashi, all of Japan

[73] Assignee: Honda Giken Kogyo K.K., Tokyo, Japan

[21] Appl. No.: 836,394

[22] Filed: Mar. 5, 1986

[30] Foreign Application Priority Data

Mar. 7, 1985 [JP] Japan .................................. 60-43804
Mar. 7, 1985 [JP] Japan .................................. 60-43805

[51] Int. Cl.$^4$ ............................................. F02P 5/15
[52] U.S. Cl. ..................................... 123/421; 123/424
[58] Field of Search ................................ 123/421, 424

[56] References Cited

U.S. PATENT DOCUMENTS

| 3,793,833 | 2/1974 | Basshuysen | 123/424 |
| 3,896,913 | 7/1975 | Maruoka | 123/421 |
| 4,096,843 | 6/1978 | Marsee | 123/421 |
| 4,104,998 | 8/1978 | Fenn | 123/421 |
| 4,351,297 | 9/1982 | Suematsu | 123/421 |
| 4,367,711 | 1/1983 | Ikeura | 123/421 |
| 4,570,596 | 2/1986 | Sato | 123/421 |

Primary Examiner—Ronald B. Cox
Attorney, Agent, or Firm—Arthur L. Lessler

[57] ABSTRACT

An ignition timing control method for an internal combustion engine having a catalytic exhaust emission purifier for scrubbing toxic exhaust gas components from engine exhaust gases by means of a catalyst, wherein the timing at which a mixture in the engine is ignited is controlled on the basis of an ignition timing set in dependence upon operating parameters of the engine. The method comprises the steps of sensing temperature of the engine after the engine is started, sensing elapsed time from the moment the engine is started when the sensed temperature lies within a predetermined temperature range, setting a delay angle correction amount in dependence upon the sensed elapsed time, correcting the ignition timing by the set delay angle correction amount, and controlling the ignition timing in accordance with the ignition timing so corrected. Preferably, the correction of the ignition timing is effected only when a particular operating condition of the engine is sensed.

8 Claims, 7 Drawing Figures

IGNITION TIMING CONTROL METHOD FOR INTERNAL COMBUSTION ENGINES

BACKGROUND OF THE INVENTION

This invention relates to an ignition timing control method for internal combustion engines and, more particularly, to a method of controlling ignition timing when starting such an engine.

A well-known method of controlling the ignition timing of an internal combustion engine includes determining a basic ignition timing conforming to operating parameters of the engine and correcting this basic ignition timing in dependence upon the temperature of the engine coolant to advance the ignition timing at low coolant temperature, thereby improving the engine driveability. This conventional method of controlling ignition timing enables the basic ignition timing to be corrected to the optimum ignition timing so that the engine will run at its best output characteristic.

In an engine equipped with a catalytic exhaust emission purifier for scrubbing toxic components from the engine exhaust gases, the catalyst will fail to be activated, with an attendant decline in scrubbing efficiency, unless the temperature of the catalyst bed rises above a predetermined value. The catalyst bed, which is heated by the engine exhaust, does not readily attain its activation temperature when the exhaust temperature is low, as it is when the engine is started. In order to obtain better emission characteristics, therefore, an effective expedient is to raise the exhaust temperature immediately after the engine is started.

To this end, an ignition timing control method proposed by, for example, Japanese Provisional Patent Publication (Kokai) No. 49-95043, teaches to elevate the exhaust temperature by applying a delay angle correction to the aforementioned optimum ignition timing. However, a problem with this method is that engine output will drop, with the risk that the engine will stall, if the optimum ignition timing is delayed when the engine temperature is low.

Another approach described in, for example, the specification of Japanese Provisional Patent Publication (Kokai) No. 56-72257, is to control the ignition timing of an internal combustion engine by applying the delay angle correction to the optimum ignition timing to raise the exhaust temperature, sensing that the catalyst bed has attained a prescribed state and then reduce the magnitude of the delay angle correction in dependence upon elapsed time measured from the moment the prescribed state is attained. With this method, however, the delay angle correction is applied even when the engine is placed in a particular operating condition following engine start, such as when the engine is rapidly accelerated to propel the vehicle forward from its standing position. Applying the correction at such time prevents the acquisition of the required engine output and makes it difficult for the vehicle to attain the desired forward acceleration. Furthermore, since the delay angle correction is applied even if the engine attains a high rotating speed, there is the threat of backfire and other problems.

SUMMARY OF THE INVENTION

It is therefore a first object of the invention to provide an ignition timing control method for an internal combustion engine, which method promptly raises catalyst bed temperature to the catalyst activation temperature at engine start when there is no danger of engine stalling, to thereby improve the emission characteristics while assuring stable engine operation at engine start.

A second object of the invention is to provide an ignition timing control method for an internal combustion engine, which method promptly raises catalyst bed temperature at engine start to improve the emission characteristics, while assuring attainment of the required engine output when the vehicle equipped with the engine is in a particular operating condition such as acceleration for standing start of the vehicle.

According to the present invention, the first object is attained by providing an ignition timing control method for an internal combustion engine having a catalytic exhaust emission purifier for scrubbing toxic exhaust gas components from exhaust gases emitted from the engine by means of a catalyst, wherein the timing at which a mixture in the engine is ignited is controlled on the basis of an ignition timing set in dependence upon operating parameters of the engine, the method comprising the steps of: sensing temperature of the engine after the engine is started; sensing elapsed time from the moment the engine is started when the sensed temperature lies within a predetermined temperature range; setting a delay angle correction amount in dependence upon the sensed elapsed time; correcting the ignition timing by the set delay angle correction amount; and controlling the ignition timing in accordance with the ignition timing so corrected.

Thus, stable operation of the engine after engine start is assured, the risk of engine stalling is eliminated and the emission characteristics is improved by promoting warming of the catalyst bed used in the exhaust emission purifier.

According to the present invention, the second object is attained by providing an ignition timing control method for an internal combustion engine having a catalytic exhaust emission purifier for scrubbing toxic exhaust gas components from exhaust gases emitted from the engine by means of a catalyst, wherein the timing at which a mixture in the engine is ignited is controlled on the basis of an ignition timing set in dependence upon operating parameters of the engine, the method comprising the steps of: sensing temperature of the engine after the engine is started; sensing a particular operating condition of the engine; sensing elapsed time from the moment the engine is started when the sensed engine temperature lies within a predetermined temperature range and the engine is in a condition other than the particular operating condition; setting a delay angle correction amount in dependence upon the sensed elapsed time; correcting the ignition timing by the set delay angle correction amount; and controlling the ignition timing in accordance with the ignition timing so corrected.

Thus, the emission characteristics at engine start is improved by promoting warming of the catalyst bed used in the exhaust emission purifier, the required engine output is assured in particular operating conditions, such as when the vehicle is starting to move forward from its standing position or is accelerating, and engine backfire is prevented.

The above and other objects, features, and advantages of the invention will be apparent from the following detailed description taken in conjunction with the accompanying drawings, in which like reference char-

DETAILED DESCRIPTION

A first embodiment of an ignition timing control method according to the invention will now be described with reference to FIGS. 1 through 6.

Figure 1:
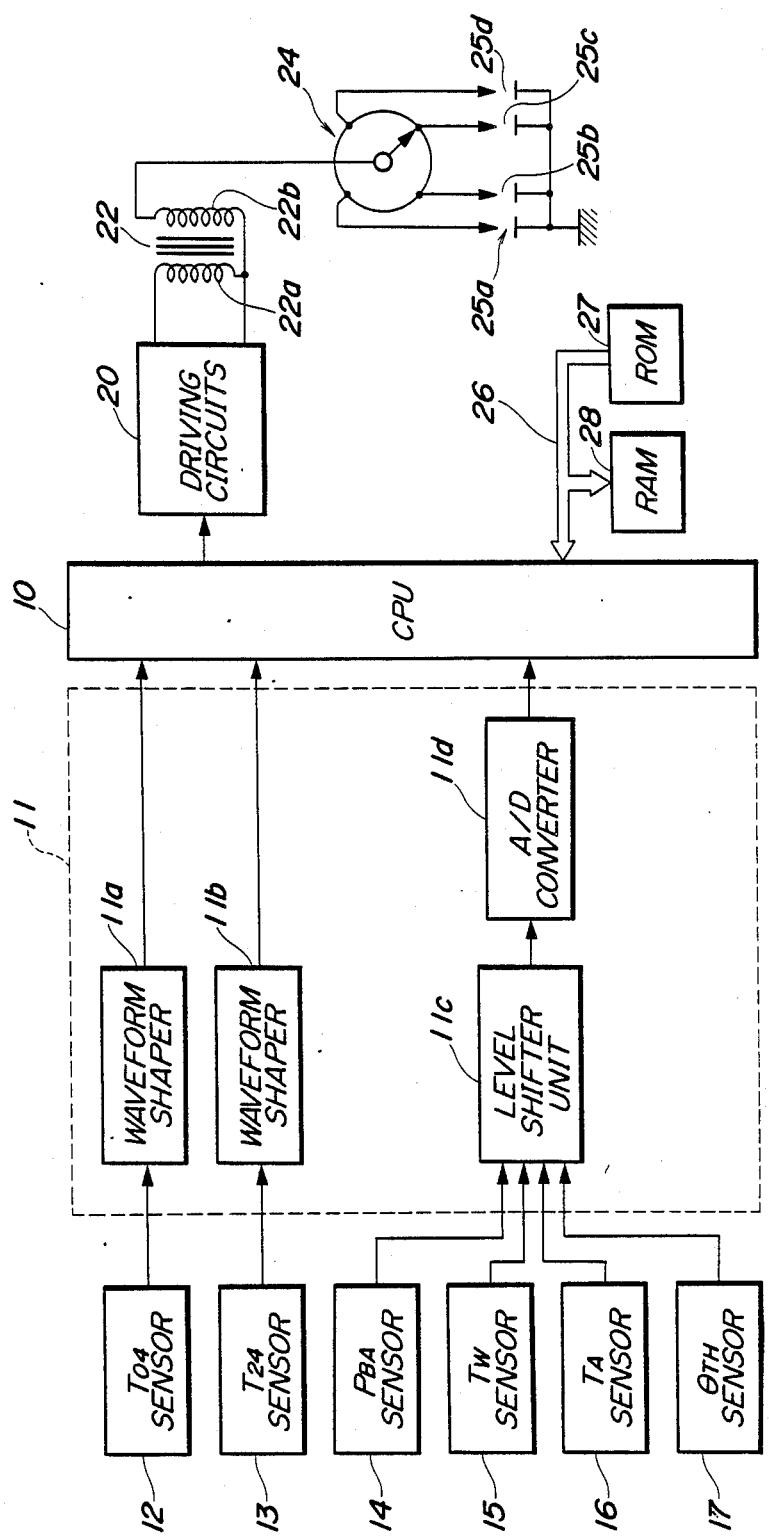
FIG. 1 is a block diagram illustrating the overall construction of an ignition timing control system for an internal combustion engine to which the method of the present invention is applied.

FIG. 1 illustrates the overall construction of an ignition timing control system to which the method of the invention is applied for controlling the ignition timing of a four-cylinder internal combustion engine, not shown. The system includes a central processing unit (hereafter referred to as "CPU") 10 having an input side to which sensors for sensing various parameters are connected via an input circuit 11. These sensors include a T04 sensor 12 arranged in facing relation, for example, to an engine camshaft, not shown, for generating a T04 signal pulse indicative of a reference crank angle position of each engine cylinder at the top dead center (TDC) position at the end of the compression stroke of each cylinder and at a predetermined crank angle position of, for example, 10° before TDC (referred to as "BTDC"). The T04 sensor 12 is connected to the CPU 10 through a waveform shaping circuit 11a in the input circuit 11. The waveform shaping circuit 11a receives T04 signal pulses from the T04 sensor 12 and shapes the pulses into rectangular pulses Sa4, Sa2, shown in FIG. 2(a), which are applied to the CPU 10.

A T24 sensor 13 which, like the T04 sensor 12, is arranged in facing relation to the periphery of the camshaft, is adapted to generate 24 equally spaced pulses (i.e., pulses produced at a 30° interval in terms of the crank angle) during one full revolution of the camshaft, namely two full revolutions of the crankshaft, which is not shown. The T24 sensor 13 is connected to the CPU 10 via a waveform shaping circuit 11b, whereby the T24 signal pulses [pulses S35, S40–S45, S20 . . . ) are shaped before being applied to the CPU 10.

The remaining sensors include an absolute pressure (PBA) sensor 14 for sensing absolute pressure PBA within an intake pipe downstream of the engine throttle valve, neither of which are shown, an engine coolant temperature (TW) sensor 15 mounted in the peripheral wall of a cylinder filled with the engine cooling water or coolant for sensing the coolant temperature TW, an intake air temperature (TA) sensor 16 for sensing intake air temperature TA in the intake pipe downstream of the engine throttle valve, and a throttle valve opening ($\theta$TH) sensor 17 for sensing valve opening of the throttle valve in the intake pipe. These sensors 14, 15, 16, and 17 are connected to the CPU 10 via a level shifter unit 11c and an A/D converter 11d of the input circuit 11. The absolute pressure sensor 14, engine coolant temperature sensor 15, intake air temperature sensor 16 and throttle valve opening sensor 17 produce analog output signals each of which is shifted to a predetermined voltage level by the level shifter unit 11c. Each analog signal so shifted is then converted into a digital signal by the A/D converter 11d before being fed into the CPU 10.

Connected to the output side of the CPU 10 is a driving circuit 20 for supplying a primary coil 22a of an ignition coil 22 with coil excitation power. The ignition coil 22 has a secondary coil 22b connected to spark plugs 25a–25d of respective cylinders via a distributor 24.

Also connected to the CPU 10 via a bus 26 are a ROM 27 storing an operational program and the like, and a RAM 28 for temporarily storing the results of calculations executed by the CPU 10 in accordance with the operational program, as well as other data.

Figure 2:
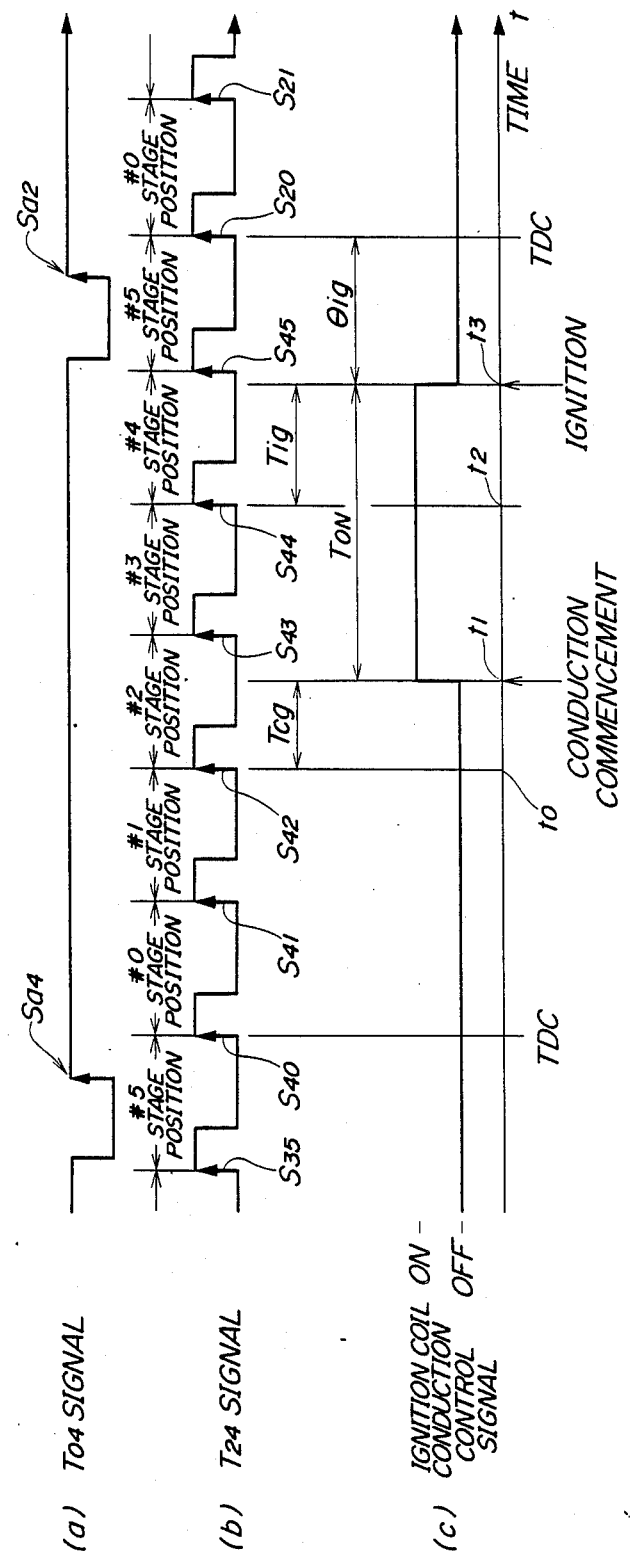
FIG. 2 is a timing chart illustrating T04 and T24 signals generated by respective T04 and T24 sensors as well as a temporal change in the generation of an ignition coil conduction control signal.

Let us now refer to FIG. 2 to describe the operation of the ignition timing control system constructed as set forth above.

On the basis of the T04 signal from the T04 sensor 12 and the T24 signal from the T24 sensor 13, the CPU 10 senses crank angle stages (hereafter referred to simply as the "stage positions") located between the reference crank angle position of each cylinder of the engine which is reached immediately before completion of a compression stroke of the cylinder and the reference crank angle position of the next cylinder within which spark ignition should be effected. More specifically, if the T24 signal pulses S40 and S20 [(b) of FIG. 2] sensed immediately after the T04 signal pulses Sa4, Sa2 of (a) of FIG. 2 are generated, respectively, are assumed to be generated at the TDC position at the end of the compression stroke of the fourth and second cylinders of the engine, respectively, then, the CPU 10, in response to generation of the T04 signal pulse Sa4, will sense the reference crank angle position of the fourth cylinder, and, in response to the T24 signal pulse S40 immediately after the generation of the T04 signal pulse Sa4, will sense a #0 stage position. The time period between the leading edge of the T24 signal pulse S40 (which is generated at TDC position in the embodiment) and the T24 signal pulse S41 in (b) of FIG. 2 is defined as the #1 stage position mentioned above. The other stage positions #1–#5 are likewise defined. The CPU 10 proceeds to sense a #1 stage position, a #2 stage position and so on in response to the T24 signal pulses S41, S42 . . . , respectively, applied thereto.

Upon sensing a predetermined stage position (e.g., the #1 stage position), the CPU 10 performs computations based on the output signals from the parameter sensors 12 through 16 to determine an ignition timing or ignition advance angle $\theta$ig, an ignition coil conduction time TON and other required quantities. The ignition advance angle θig is computed by the use of the following equations (1) and (2):

$$\theta ig = \theta igMAP + \theta CR \quad (1)$$

$$\theta ig = \theta ig - \theta OWU \quad (2)$$

The ignition advance angle θig is expressed in terms of the crank angle before a crank angle position, e.g. TDC position, at which a T24 signal pulse e.g. S20 in (b) of FIG. 2 is generated immediately after a T04 signal pulse, e.g. Sa2 [(a) of FIG. 2]indicative of the reference crank angle position of a cylinder, e.g. the second cylinder, within which ignition should be effected. θigMAP represents a basic ignition timing or ignition advance angle which is determined as a function of engine rotational speed (rpm) Ne and a parameter representing engine load, such as the absolute pressure PBA within the intake pipe. More specifically, a value commensurate with the sensed value PBA of absolute pressure and the sensed value Ne of engine rpm is read as the value of θigMAP from an Ne-θig map stored in the ROM 27. It should be noted that the engine rpm Ne is calculated by the CPU 10 each time a pulse in the T24 signal is applied thereto. The technique used is to calculate Ne as the reciprocal of a value Me, which is obtained by counting a number of pulses of a predetermined clock produced during the pulse generation interval of the T24 signal. θCR represents another advance delay angle correction amount determined by such factors as the engine coolant temperature TW and intake air temperature TA.

Equation (2) above is applicable only when the engine is in a predetermined operating condition immediately after being started. In Equation (2), θOWU represents the value of a correction variable, namely a delay angle correction amount, applied after engine start and constitutes a feature of the present invention. θOWU will be described in greater detail later.

Next, the CPU 10 computes the conduction time TON of the primary coil 22a of the ignition coil 22. The conduction time TON is set to a value deemed to be optimum from the standpoint of preventing both overheating of the coil and misfire of the spark plugs. In general, TON is obtained as a function of the engine rpm Ne.

The CPU 10 then proceeds to compute the conduction initiation timing Tcg and conduction termination timing Tig of the primary coil 22a based on the ignition advance angle θig and conduction time TON found in the manner set forth above. To accomplish this, the CPU 10 first counts back, from a TDC position [at T24 signal pulse S20 in (b) of FIG. 2] immediately after the reference crank angle position of the second cylinder within which the ignition should be effected, a crank angle position [a position corresponding to instant t1 in FIG. 2(c)] at which conduction of the primary coil 22a is to start based on the ignition advance angle θig and conduction time TON, and determines which stage position is the crank angle position at which conduction is to start. The CPU 10 then finds the period of time needed for this crank angle position to be attained by rotation of the crankshaft from instant t0 [FIG. 2(c)], which is that at which the T24 signal pulse S42 in the determined stage position (the #2 stage position in the illustrated embodiment) enters the CPU 10. This period of time is the conduction initiation timing Tcg. Likewise, the CPU 10 determines which stage position is the crank angle position [a position corresponding to the instant t3 in FIG. 2(c)]at which conduction of the coil 22a is to be terminated based on the ignition angle θig. The CPU 10 then finds the period of time needed for this crank angle position to be attained by rotation of the crankshaft from instant t2, which is that at which the T24 signal pulse in the determined stage position (the #4 stage position in the illustrated embodiment) enters the CPU 10. This period of time is the conduction termination timing Tig.

The CPU 10 has internal counters (not shown) used in the process for initiating and terminating conduction of the primary coil 22a. Using the conduction initiating counter, the CPU 10 waits for the elapse of the conduction ignition time period Tcg extending from detection (instant t0) of the T24 signal pulse (S42) of the stage position at which conduction of the primary coil 22a is to start is detected, and applies a conduction control signal to the driving circuit 20 at the instant (t1) the period of time Tcg expires. Then, using the conduction terminating counter, the CPU 10 waits for the elapse of the conduction termination time period Tig extending from detection (instant t2) of the T24 signal pulse (S44) of the stage position at which conduction of the primary coil 22a is to stop, and removes the conduction control signal from the driving circuit 20 at the instant (t3) the period of time Tig expires.

The driving circuit 20 supplies the primary coil 22a of ignition coil 22 with the coil excitation power for the period of time during which the CPU 10 supplies the driving circuit 20 with the conduction control signal. When supply of the coil excitation power is cut off from the driving circuit 20, a high voltage is produced in the secondary coil 22b of ignition coil 22 and is supplied to a spark plug (spark plug 25c in the illustrated embodiment) by the distributor 24, thereby igniting the spark plug by causing it to produce a spark discharge.

Figure 3:
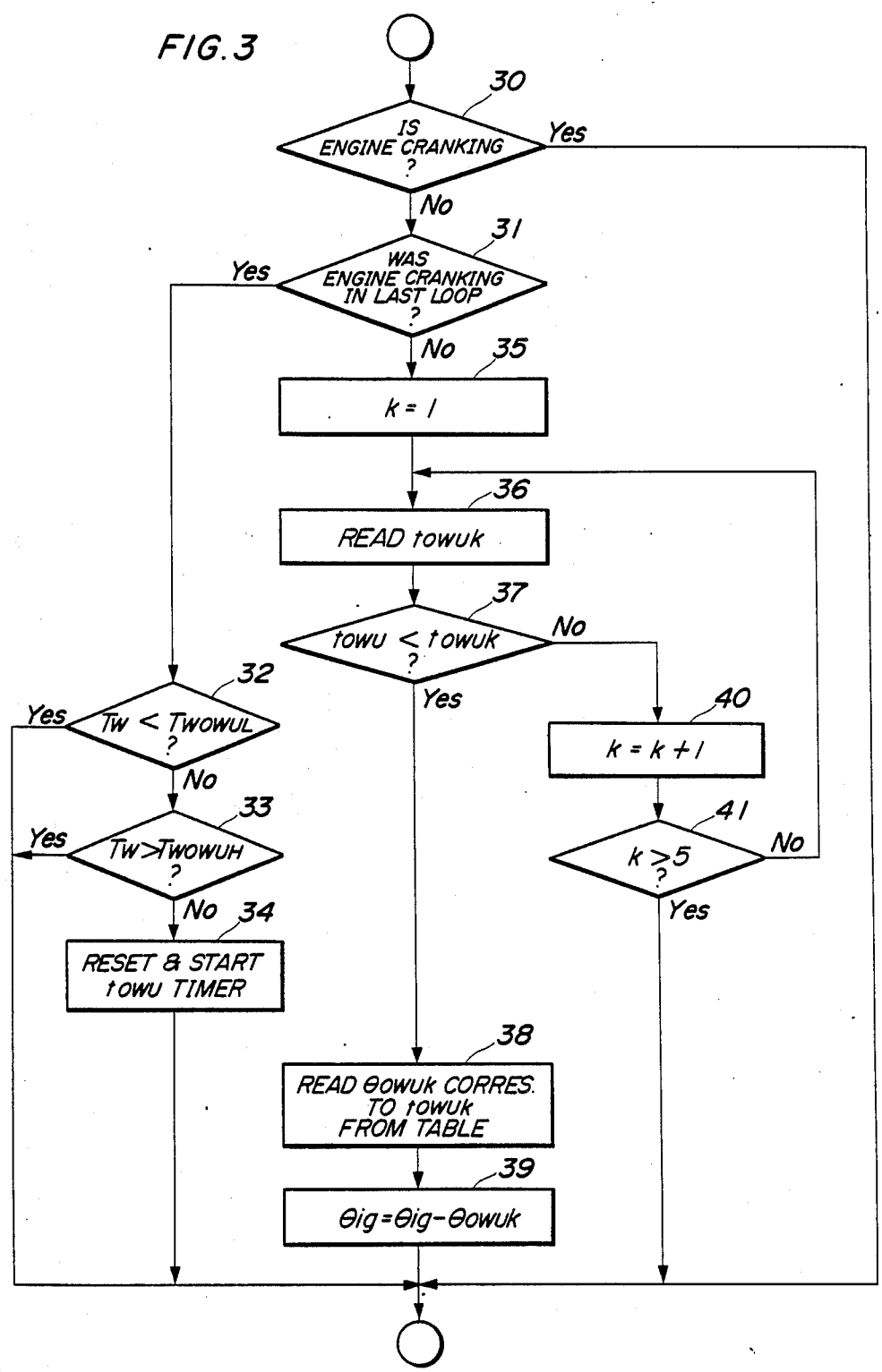
FIG. 3 is a flowchart illustrating a manner of applying a delay angle correction to an ignition advance angle in accordance with a first embodiment of the method of the present invention.

FIG. 3 is a flowchart of a procedure executed internally of the CPU 10 for setting the correction variable value θOWU applied at engine start in accordance with the first embodiment of the present invention, and for correcting the ignition advance angle θig thereby.

The first step of the flowchart is a step 30, at which the CPU 10 makes a determination as to whether or not the engine is in a cranking state. The cranking state is construed to prevail if, by way of example, the engine rotational speed Ne is less that a predetermined cranking rpm value NECR (e.g., 350 rpm) and a starter (not shown) is in the operating state, i.e., switched on. If the cranking state is thus found to prevail at step 30, the present program ends without application of the delay angle correction to the ignition advance angle θig. If a negative decision is rendered at step 30, on the other hand, then the program proceeds to a step 31, which calls for a determination as to whether the engine was in the cranking mode in the last loop of execution of the program.

If an affirmative decision is rendered at the step 31, namely if the current loop of the program is the first to be executed since the engine left the cranking state, then the CPU 10 determines at the next two steps 32, 33 whether the sensed value TW of engine coolant temperature lies between predetermined upper and lower limit values, i.e. within a predetermined temperature range. Specifically, step 32 calls for the CPU 10 to determine whether the sensed value TW of engine coolant temperature is less than a predetermined lower limit value TWOWUL (e.g., 15° C.), and step 33 calls for the CPU 10 to determine whether the sensed value TW is greater than a predetermined upper limit value TWOWUH (e.g., 35° C.) If the answer is YES in either of these two steps 32, 33, namely if the value TW falls outside the range, shown in FIG. 6, that is specified by these predetermined upper and lower limit values, then the CPU 10 ends the present program, and henceforth refrains from executing this program again, without applying the delay angle correction to the ignition advance angle θig.

When the value of TW is found at steps 32, 33 to lie within the range specified by the predetermined upper and lower limit values, the program proceeds to a step 34 at which a count in a tOWU timer (not shown), which is an element constituting the CPU 10, is reset to zero and then the timer is restarted.

If a negative decision is rendered at the step 31, a program variable k is initialized to 1 at a step 35, W a predetermined timer discrimination value tOWUK (e.g., 10 sec when k=1 holds) corresponding to the variable k is read out, and it is determined at a step 37 whether a value tOWU clocked by the tOWU timer is less than the predetermined discrimination value tOWUK. If the answer is YES at the step 37, the next step 38 calls for the CPU 10 to go to a table to look up a delay angle correction amount θOWUK corresponding to the predetermined discrimination value tOWUK read at step 36.

Figure 4:
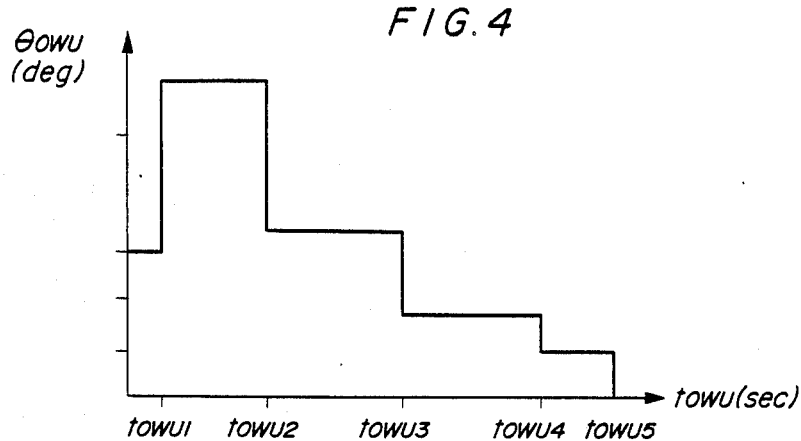
FIG. 4 is a graph showing a table indicating the relationship between a correction variable $\theta$OWU and elapsed time tOWU.

FIG. 4 is a table illustrating the relationship between the value tOWUK and the value θOWUK. For values of tOWUK in five stages of from tOWU1 (e.g., 10 sec) to tOWU5 (210 sec), θOWUK is set to values of from θOWU1 (e.g., 6°) to θOWU5 (e.g., 3°) These discrimination values of tOWUK and delay angle correction amounts θOWUK are stored in the ROM 27. It should be noted that the delay angle correction amounts θOWUK established for the tOWUK values in FIG. 4 are set at optimum values, obtained through experimentation, that will enable a catalytic exhaust emission purifier to attain the activated state promptly following engine start.

Following the retrieval of θOWUK at the step 38, a step 39 calls for the CPU 10 to perform a delay angle correction on the basis of Equation (2) in order to delay the ignition advance angle θig, found in accordance with Equation (1), by the delay angle correction amount θOWU obtained at step 38.

If the value tOWU is found at the step 37 to be greater than the predetermined discrimination value tOWUK, the variable value k is incremented by 1 at a step S40, and it is determined at the next step 41 whether the variable value k is greater than 5; if it is not, then the program returns to the step 36 where a discrimination value tOWUK corresponding to the new value of k is read.

When the detected value tOWU in the tOWU timer at the moment the variable value k becomes equal to five is smaller than the predetermined discrimination value tOWU5 corresponding to k=5, the steps 38 and 39 are executed to correct the advance angle θig based on the delay angle correction quantity θOWU5. When the value of tOWU exceeds the predetermined discrimination value tOWU5, however, a YES decision is rendered at the step 41, so that the CPU 10 ends the delay angle correction implemented by the present program.

Thus, in controlling the delay of the ignition advance angle θig, the delay angle correction amount applied is stepwise reduced for a given period of time (210 sec) with the lapse of time after engine start. It should be noted that the delay angle control illustrated in FIG. 4 is performed on the basis of the maximum delay angle correction amount after the lapse of a predetermined time tOWU1 (10 sec) following engine start, rather than immediately after the engine is started. Before the lapse of the time period tOWU1, the delay angle correction is carried out using a correction amount (θOWU1, 6°) smaller than the maximum delay angle correction amount (θOWU2, e.g., 10°). The reason for this is that a large fluctuation in engine rotation is a frequent occurrence immediately after engine start, in which case the application of a large delay angle correction would result in a significant loss in engine output power and, hence, the danger of engine stalling. Control executed in the manner shown in FIG. 4 prevents this from occurring.

Figure 5:
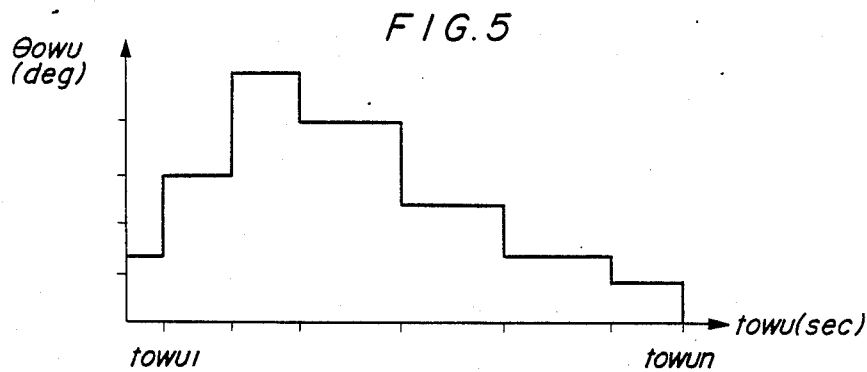
FIG. 5 is a graph showing a table indicating another relationship between the correction variable $\theta$OWU and elapsed time tOWU.
Figure 6:
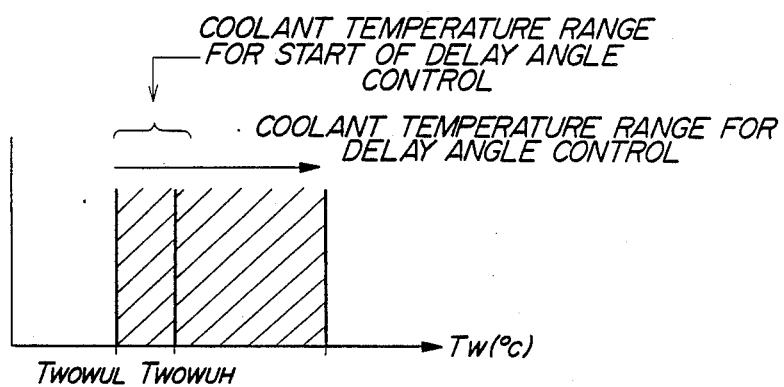
FIG. 6 is a diagram illustrating an engine cooling water temperature range within which an ignition advance angle is subjected to delay angle control.

FIG. 5 illustrates an alternative method of applying delay angle control. Here the delay angle correction amount applied is set to gradually higher values and then to gradually lower values as the sensed elapsed time grows larger.

Thus, in accordance with the above-described first embodiment of the ignition timing control method for an internal combustion engine equipped with a catalytic exhaust emission purifier, stable operation of the engine after engine start is assured, the risk of engine stalling is eliminated, and the emission characteristics is improved by promoting warming of the catalyst bed used in the exhaust emission purifier.

A second embodiment of an ignition timing control method according to the present invention will now be described with reference to FIG. 7.

Figure 7:
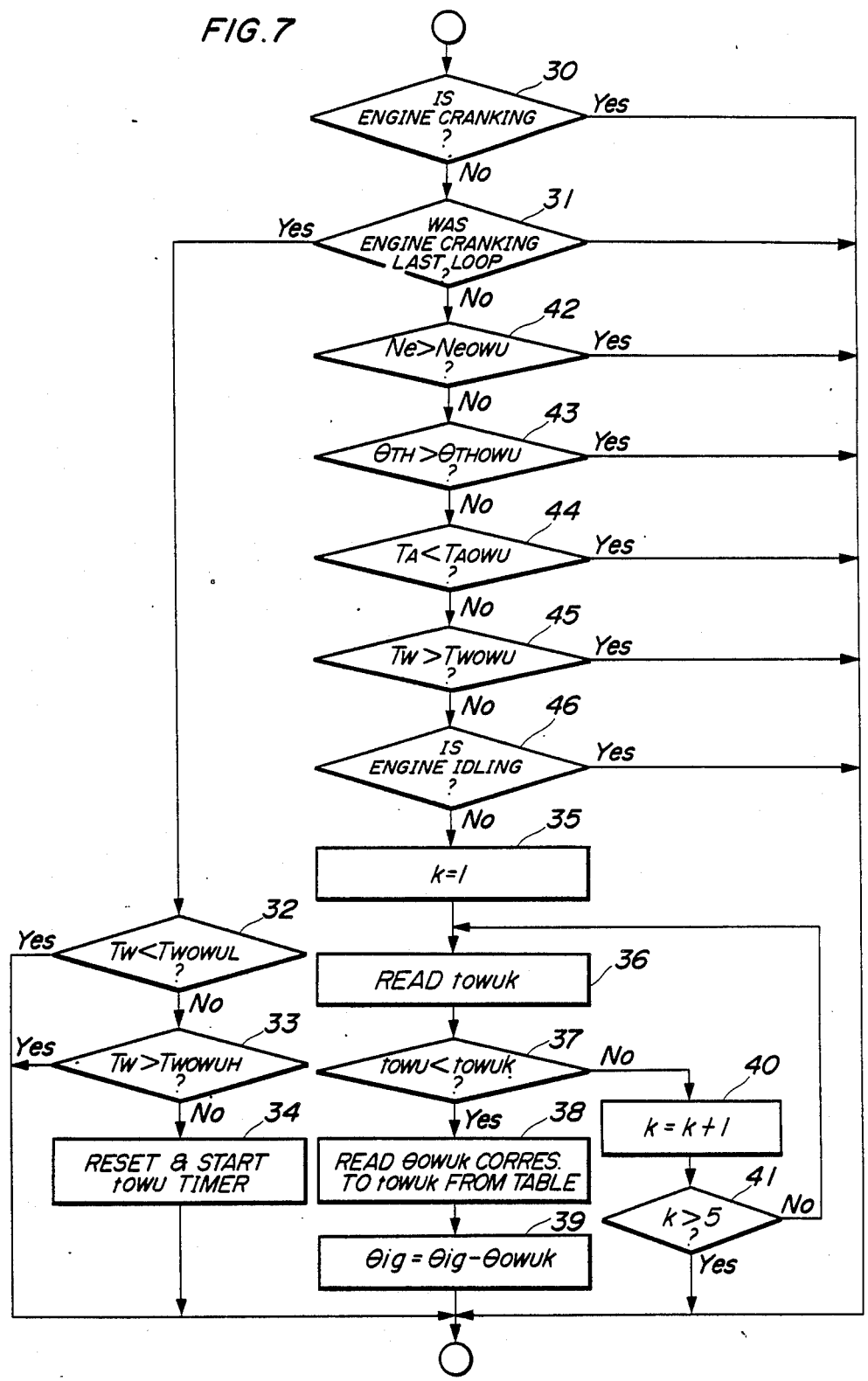
FIG. 7 is a flowchart illustrating a manner of applying a delay angle correction to an ignition advance angle in accordance with a second embodiment of the method of the present invention.

FIG. 7 is a flowchart of a procedure executed internally of the CPU 10 for setting the correction variable value θOWU applied when the engine is cold-started in accordance with a second embodiment of the invention, and for correcting the ignition advance angle θig thereby. This embodiment of the invention addresses the above-mentioned problems of reduced engine output and backfire encountered when the conventional delay angle correction is applied with the engine in a particular operating condition following engine start.

The flowchart of FIG. 7 is identical with that of FIG. 3 except for steps 42–46 inserted between the steps 31 and 35 of FIG. 3. Accordingly, the identical steps are designed by like reference numerals.

As described above in connection with the flowchart of FIG. 3, step 31 calls for the CPU 10 to determine whether the engine was in the cranking mode in the last loop of execution of the program. If the decision rendered here is NO, the CPU 10 determines through steps 42–45 whether the engine is in one of particular operating conditions. Specifically, it is determined at step 42 whether the engine rotational speed Ne is higher than a predetermined rpm value NeOWU (e.g., 3000 rpm). If the answer is YES, then the present program is ended without application of the delay angle correction. The reason for this is that applying the delay angle correction when the engine is in the high rpm region might cause the engine to backfire. Another reason is that a good output characteristic is desirable in this region of high engine speed.

If a negative decision is rendered at the step 42, the next step 43 calls for a determination as to whether the throttle valve opening θTH is greater than a predetermined throttle opening value θTHOWU (e.g., 20°). If it is, then the present program is ended without application of the delay angle correction. The reason for this is that a throttle valve opening θTH greater than the predetermined throttle valve opening value θTHOWU signifies that the vehicle is starting to move forward from its standing position or is accelerating. When such is the case, the best engine output characteristic is desired in order to assure the engine output required.

If a NO answer is obtained at the step 43, the next step 44 calls for the CPU 10 to determine whether the intake air temperature TA is below a predetermined temperature value TAOWU (e.g., 15° C.). If the decision rendered is affirmative, then the present program is ended without application of the delay angle correction. This is because an intake air temperature TA below the predetermined temperature value TAOWU indicates a state in which the mixture in engine cylinders is difficult to ignite. When such is the case, what is desired is to advance, not delay, the ignition timing for the purpose of obtaining excellent combustion of the mixture.

If a NO decision is rendered at the step 44, it is determined at the next step 45 whether the engine coolant temperature TW is higher than a predetermined temperature value TWOWU (e.g., 70° C.). A YES decision causes the CPU 10 to end the present program without performing the delay angle correction. This is because a value of TW higher than TWOWU indicates that the exhaust temperature is high enough to rapidly raise the catalyst bed temperature to a high temperature without applying the delay angle correction to the ignition timing. When such a condition prevails, the program is ended without applying the correction.

If a NO answer is obtained at the step 45, it is determined at the next step 46 whether the engine is idling. If it is, then the present program is ended without application of the delay angle correction. The reason is the need to achieve stable idling rotation when the engine is in the idling mode. Note that the engine is construed to be idling by sensing that the opening θTH of the throttle valve arranged in the engine intake system is indicative of the fully closed or nearly fully closed state, or by sensing that absolute pressure within the intake pipe downstream of the throttle valve is lower than a predetermined value.

If a NO decision is rendered at the step 46, the program proceeds to the next step 35 and thence to the steps 36–41 described above to prevent engine stalling.

Advantageously it should be so arranged that even if the delay angle correction conditions of steps 42–45 all fail to hold at the same time, a delay angle correction conforming to a predetermined period of time (0–210 sec) after engine start is performed in the step 35 et seq. if any of the delay angle correction conditions (steps 42–45) is established before the lapse of the predetermined time (210 sec) after the vehicles starts moving forward.

Thus, in accordance with the above-described second embodiment of the ignition timing control method of the present invention, the emission characteristics is improved by promoting warming of the catalyst bed used in the exhaust emission purifier, the required engine output is assured in particular operating conditions at engine start, such as when the vehicle is starting to move forward from its standing position or is accelerating, and engine backfire is prevented.

As many apparently widely different embodiments of the present invention can be made without departing from the spirit and scope thereof, it is to be understood that the invention is not limited to the specific embodiments thereof except as defined in the appended claims.

What is claimed is:

1. An ignition timing control method for an internal combustion engine having a catalytic exhaust emission purifier for scrubbing toxic exhaust gas components from exhaust gases emitted from the engine by means of a catalyst, wherein the timing at which a mixture in the engine is ignited is controlled on the basis of an ignition timing set in dependence upon operating parameters of the engine, the method comprising the steps of:

sensing temperature of the engine after the engine is started;

sensing a particular operating condition of the engine;

sensing elapsed time from the moment the engine is started when the sensed engine temperature lies within a predetermined temperature range, within which said ignition timing can be retarded for activation of said catalyst without causing stalling of said engine, and at the same time the engine is in a condition other than said particular operating condition;

setting a delay angle correction amount in dependence upon the sensed elapsed time, said delay angle correction amount being set ot lower values as the sensed elapsed time grows larger;

correcting the ignition timing by the set delay angle correction amount;

controlling the ignition timing in accordance with the optimum ignition timing so corrected; and terminating correction of the ignition timing immediately when said particular operating condition of the engine is sensed even if the ignition timing is being controlled in accordance with the optimum ignition timing so corrected.

2. An ignition timing control method for an internal combustion engine having a catalytic exhaust emission purifier for scrubbing toxic exhaust gas components from exhaust gases emitted from the engine by means of a catalyst, wherein the timing at which a mixture in the engine is ignited is controlled on the basis of an ignition timing set in dependence upon operating parameters of the engine, the method comprising the steps of:

sensing temperature of the engine after the engine is started;

sensing elapsed time from the moment the engine is started when the sensed engine temperature lies within a predetermined temperature range;

setting a delay angle correction amount in dependence upon the sensed elapsed time, the delay angle correction amount being set to gradually higher values and then to gradually lower values as the sensed elapsed time grows larger;

correcting the optimum ignition timing by the set delay angle correction amount; and controlling the ignition timing in accordance with the ignition timing so corrected.

3. An ignition timing control method for an internal combustion engine having a catalytic exhaust emission purifier for scrubbing toxic exhaust gas components from exhaust gases emitted from the engine by means of a catalyst, wherein the timing at which a mixture in the engine is ignited is controlled on the basis of an ignition timing set in dependence upon operating parameters of the engine, the method comprising the steps of:

sensing temperature of the engine after the engine is started;

sensing a particular operating condition of the engine;

sensing elapsed time from the moment the engine is started when the sensed engine temperature lies within a predetermined temperature range and the engine is in a condition other than said particular operating condition;

setting a delay angle correction amount in dependence upon the sensed elapsed time, the delay angle correction amount being set to gradually higher values and then to gradually lower values as the sensed elapsed time grows larger;

correcting the ignition timing by the set delay angle correction amount; and controlling the ignition timing in accordance with the optimum ignition timing so corrected.

4. The method as claimed in claim 1, wherein said particular operating condition of the engine is a state in which the engine rotational speed is greater than a predetermined value higher than idling speed of the engine.

5. The method as claimed in claim 1, wherein said particular operating condition of the engine is a state in which the opening degree of a throttle valve arranged in an intake system of the engine is greater than a predetermined value.

6. The method as claimed in claim 1, wherein said particular operating condition of the engine is a state in which intake air temperature of the engine is lower than a predetermined value.

7. The method as claimed in claim 1, wherein said particular operating condition of the engine is a state in which engine coolant temperature is higher than a predetermined value.

8. The method as claimed in claim 1, wherein said particular operating condition of the engine is a state in which the engine is idling.

* * * * *